(12) United States Patent
Einola et al.

(10) Patent No.: US 6,909,895 B2
(45) Date of Patent: Jun. 21, 2005

(54) SGSN SEMI ANCHORING DURING THE INTER SGSN SRNC RELOCATION PROCEDURE

(75) Inventors: Heikki Einola, Espoo (FI); Serge Haumont, Helsinki (FI); Paul Sitch, Espoo (FI); Jaakko Rajaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 711 days.

(21) Appl. No.: 10/000,242

(22) Filed: Oct. 18, 2001

(65) Prior Publication Data

US 2002/0064144 A1 May 30, 2002

Related U.S. Application Data

(63) Continuation of application No. PCT/EP99/02965, filed on Apr. 30, 1999.

(51) Int. Cl.$^7$ ............................. H04Q 7/20; H04L 12/28
(52) U.S. Cl. ........................ 455/423; 455/436; 370/389; 370/392; 370/400
(58) Field of Search .............................. 455/422.1, 423, 455/432.2, 432.1, 433, 435.2, 445, 446, 461, 436, 450, 452.2, 67.11; 370/389, 392, 400, 312, 315, 328, 338, 351, 401, 409, 428

(56) References Cited

U.S. PATENT DOCUMENTS

| 6,101,387 | A | * | 8/2000 | Granberg et al. | ............ 455/433 |
| 6,442,616 | B1 | * | 8/2002 | Inoue et al. | ................ 455/433 |
| 6,463,055 | B1 | * | 10/2002 | Lupien et al. | ............... 370/353 |
| 6,603,763 | B1 | * | 8/2003 | Koshino | ....................... 370/389 |
| 2001/0019544 | A1 | * | 9/2001 | Bakke et al. | ................ 455/437 |

FOREIGN PATENT DOCUMENTS

| WO | WO 98/32303 | 7/1998 |
| WO | WO 98/47302 | 10/1998 |
| WO | WO 99/34635 | 7/1999 |

* cited by examiner

Primary Examiner—Quochien B. Vuong
Assistant Examiner—John J. Lee
(74) Attorney, Agent, or Firm—Squire, Sanders & Dempsey L.L.P.

(57) ABSTRACT

The present invention proposes a method for performing a relocation procedure for a user equipment (UE) communicating in a communication network and being movable therein, said communication network comprising at least two serving nodes (SGSN1, SGSN2) of a core network of said communication network, each of which serving nodes being connected to at least one access network controller (RNC1, RNC2) of a access network of said communication network, each of which access network controllers being adapted to perform a communication with said user equipment (UE) within its coverage area, and each serving node being assigned to a respective routing area (RA1, RA2), said method comprising the steps of monitoring (S100) the occurrence of a relocation condition, deciding (S200), whether said relocation condition is an inter serving node relocation condition, switching (S400) the communication from a first access network controller (RNC1) of a first serving node (SGSN1) to a second access network controller (RNC2) of a second serving node (SGSN2), when the decision in said decision step (S200) is positive; maintaining (S600) the control of communication in the core network anchored in the first serving node (SGSN1) while the communication connection is in a first state (S500); and changing (S700) the control of communication in the core network to the second serving node (SGSN2), when a changing condition is detected (S500). The present invention also proposes a corresponding system and network element.

18 Claims, 6 Drawing Sheets

SGSN SEMI ANCHORING DURING THE INTER SGSN SRNC RELOCATION PROCEDURE

This application is a continuation of international application service No. PCT/EP99/02965, filed Apr. 30, 1999.

FIELD OF THE INVENTION

The present invention relates to a method for performing a relocation procedure for a user equipment communicating in a communication network and being movable therein, wherein the relocation initiated by said user equipment is to be performed between radio network controllers and between serving nodes. The present invention relates also to a corresponding system and network element. In particular, the present invention is directed to a method and a corresponding system and network element for semi anchoring control in a first serving node during an inter serving node relocation procedure.

BACKGROUND OF THE INVENTION

In recent years, the usage of mobile telecommunication systems for receiving and transmitting data packets becomes more and more important. In order to reach high transmission rates and better resource utilization in comparison with the circuit switching originally designed for voice sessions, a packet orientated communication network infrastructure for packet switching was introduced in the mobile telecommunication systems, for example, the General Packet Radio Service (GPRS) within, e.g., the GSM system or the Universal Mobile Telecommunication Service (UMTS) in $3^{rd}$ generation systems.

To support different network protocols such as internet protocol (IP) and the like, these new services require new network nodes in a core network. In the case of the above mentioned GPRS or UMTS, one of these nodes is a Serving GPRS Support Node (SGSN), keeping track of individual terminals, e.g. user equipment UE, such as mobile stations, and performing security functions and access control. The SGSN is connected to another new node, the Gateway GPRS Support Node (GGSN), which provides interworking with external packet switched networks.

The detailed hierarchical arrangement and network elements, as e.g. shown in FIG. 1, of a packet switched network is described below. In this case, a UMTS-communication system is shown. Other systems, like the GPRS-system, have a similar structure.

A communication area covered by the network is divided in several routing areas RA each controlled by a distinct serving node SGSN. Within said routing area, at least one access network, e.g. a radio access network (RAN), consisting of a access network controller, e.g. a radio network controller RNC, and associated transceiver stations is provided for establishing a communication connection between a user equipment UE within said routing area and the core network comprising the SGSN and the GGSN.

When the user equipment UE being in a mobility management (MM) connected state (i.e. connection between the user equipment UE and the core network is active) is moved from a communication area covered by a first radio network controller (i.e., the access network controller) to a communication area covered by a second radio network controller, a relocation procedure of the serving radio network controller (SRNC relocation procedure) is required for switching control to the second RNC. In the case that said second radio network controller RNC is in another routing area RA and therefore connected to a second serving node SGSN, additionally an inter SGSN relocation has to be executed.

The SRNC relocation procedure in combination with a routing area change (i.e. a SGSN change) of the user equipment as conventionally performed will now be explained with reference to FIGS. 2A and 2B. This combined relocation is referred herein below as an "inter SGSN SRNC relocation procedure".

In the communication network, e.g. in the serving radio network controller SRNC, a decision is taken that a SRNC relocation procedure has to be performed. This includes a decision as to which radio network controller RNC will be the next serving radio network controller SRNC. The first SRNC (RNC1) sends a SRNC relocation request message 1 to the first serving node SGSN1 which message indicates the need for SRNC relocation. This message includes parameters such as identifier of the new SRNC. Upon receipt of the SRNC relocation request message 1, the serving node SGSN1 determines from the received information that the SRNC relocation will also result in a change of the serving node SGSN. The SGSN1 then sends a forward SRNC relocation request message 2 to a new serving node SGSN2 including the information received from the first SRNC (RNC1) and necessary information for the change of the SGSN (e.g. MM context, Packet Data Protocol (PDP) context). Then, the SGSN2 sends a SRNC relocation request message 3 to the new SRNC (RNC2). This message includes information for establishing the SRNC context, transparently sent from the first radio network controller RNC1 (e.g. user equipment identity, user equipment capability information and the like). When the second radio network controller RNC2 completed its preparation phase, a SRNC relocation proceeding message 4 is sent to the second serving node SGSN2. When traffic resources between the RNC2 and the SGSN2 have been allocated and the SGSN2 is ready for the SRNC change, then a forward SRNC relocation response message 5 is sent from the serving node SGSN2 to the serving node SGSN1. This message indicates that necessary resources have been allocated for the SRNC relocation. When the first serving node SGSN1 receives the forward SRNC relocation response message 5, the SGSN1 indicates the completion of the preparation phase at the core network side for the SRNC relocation by sending a SRNC relocation proceeding message 6 to the first radio network controller RNC1. After receiving the SRNC relocation proceeding message 6, the RNC1 sends a SRNC relocation commit message 7 to the second radio network controller RNC2. The RNC2 executes a switching of all bearers at the earliest suitable time instance. Immediately after a successful switching to the RNC2, the RNC2 (which is now the SRNC) sends a SRNC relocation complete message 8 to the second serving node SGSN2. The RNC2, acting as SRNC, sends also new MM system information 9 to the user equipment UE indicating, e.g., the current relevant routing area. The second serving node SGSN2 sends a complete SRNC relocation message 10 towards the SGSN1. Upon receipt of the complete SRNC relocation message 10, the SGSN1 sends a release indication message 11 to the RNC1. This implies release of all radio access network resources of the RNC1 related to the user equipment UE.

At this time, the control in the radio access network is switched from the first radio network controller RNC1 to the second radio network controller RNC2. Hence, with reference to FIG. 1, data flows from the user equipment UE via the radio network controller RNC2 to the serving node SGSN2, to the serving node SGSN1, to the gateway node GGSN and therefrom to the external network in uplink direction and vice versa in downlink direction. The first serving node SGSN1 is involved because control in the core network is still at the SGSN1. However, it is to be noted, that additional steps (or messages) may be introduced in the above described relocation procedure depending on which procedure is used for the inter SGSN relocation. These steps will be described herein below, respectively, in connection with the known inter SGSN relocation procedures.

Hitherto, two solutions are known for the above mentioned inter SGSN SRNC relocation procedure, a "floating SGSN" and an "anchored SGSN".

In the "floating SGSN" solution, "floating" means that the control in the packet switched core network is transferred to the second serving node SGSN2 of the second routing area RA2 as soon as possible after a corresponding SRNC relocation procedure. In this case, as shown in FIG. 2B, the second serving node SGSN2 initiates an PDP context update by messages 12 to the gateway node GGSN as soon as it receives the SRNC relocation complete message 8 and before it sends the complete SRNC relocation message 10 to the first serving node SGSN1. The SGSN2 also informs a home location register (HLR) of the change of the serving node, which home location register in turn sends a cancel command to the first serving node SGSN. Thereafter, the SGSN2 sends a RA update command 13 to the user equipment UE which is forced by said command to perform a routing area update. This RA update command 13 is a layer 3 Mobility Management (MM) command. Upon receipt of the command 13, routing area update proceeds.

As a result of the above described "floating SGSN" solution, control in the packet switched core network is transferred from the first serving node SGSN1 to the second serving node SGSN2. Hence, data flows from the user equipment UE via the radio network controller RNC2 to the serving node SGSN2, to the gateway node GGSN and therefrom to the external network in uplink direction and vice versa in downlink direction. In this case the transfer of data is optimized. However, the "floating" solution requires a very long and complex signaling procedure. Additionally, the transfer of control between the SGSN1 and the SGSN2 takes place without the knowledge or even participation of the user equipment, since it is initiated by the serving radio network controller SRNC. In case the user equipment UE being in an active session leaves the coverage area during this process, it is not aware of switching the control to another routing area. When the user equipment UE tries to perform a routing area update or attach procedure on returning to the coverage area, PDP contexts may therefore be lost. Therefore, quality of service (QoS) may be affected.

The second solution for SGSN relocation mentioned above is an "anchored SGSN". Herein, "anchored" means that the control in the packet switched core network is never transferred from the first serving node SGSN1 of the first routing area RA1. In this case the SRNC relocation procedure is performed as described above. Thereafter, with reference to FIG. 1, data flows as described above (UE→RNC2→SGSN2→SGSN1→GGSN→external network in uplink direction and vice versa in downlink direction). Unlike the "floating SGSN" solution described above, here the control of the core network remains at the first serving node SGSN1. Also, the second serving node SGSN2 does not initiate an update of PDP context to the gateway node GGSN. Therefore, the messages 12 and 13 in FIG. 2B can to be omitted. Hence, data are to be relayed from the first serving node SGSN1 to the second serving node SGSN2, which controls the second routing area RA2, in downlink direction and vice versa in uplink direction.

As a result, the "anchored SGSN" solution for inter SGSN relocation is a rather simple and robust procedure. Because no PDP context updates are required, none of the routing area update problems inherent in the "floating" solution apply. However, there is another drawback. Namely, the route across the core network from the current SGSN to the gateway node GGSN is not optimized, since each new serving node SGSN needs the foregoing SGSN(s) as relay stations to the GGSN. If the user equipment UE moves across several routing areas, three or even more serving nodes SGSN need to be involved within the communication. This is particularly wasteful for communication network resources, especially when the PDP context last for a long time (hours or even days).

In the post-published document WO 99/34635, there is disclosed a method for handing over a connection from one SGSN to another SGSN by giving the old SGSN a role of a temporary anchor.

SUMMARY OF THE INVENTION

Therefore, it is an object of the invention to provide a method for performing a relocation procedure for a user equipment UE communicating in a communication network and being movable therein, in which method the risk of data loss during a inter SGSN SRNC relocation procedure is minimized while the data flow is optimized after completion of the relocation, and to provide a corresponding system and network device adapted to perform such a relocation procedure.

According to the present invention, this object is achieved by a method for performing a relocation procedure for a user equipment communicating in a packet oriented communication network and being movable therein, said packet oriented communication network comprising at least two serving nodes of a core network of said packet oriented communication network, each of which serving nodes being connected to at least one access network controller of a access network of said packet oriented communication network, each of which access network controllers being adapted to perform a communication with said user equipment within its coverage area, and each serving node being assigned to a respective routing area, said method comprising the steps of monitoring the occurrence of a relocation condition, deciding, whether said relocation condition is an inter serving node relocation condition, switching the communication from a first access network controller of a first serving node to a second access network controller of a second serving node, when the decision in said decision step is positive, maintaining the control of communication in the core network anchored in the first serving node while the communication connection is in a first state in which it stays as long as there are data to be transmitted, and changing the control of communication in the core network to the second serving node, when a changing condition is detected.

Furthermore, the present invention proposes a system for performing a relocation procedure for a user equipment communicating in a packet oriented communication network and being movable therein, said packet oriented communication network comprising at least two serving nodes of a core network of said packet oriented communication network, each of which serving nodes being connected to at least one access network controller of a access network of said packet oriented communication network, each of which access network controllers being adapted to perform a communication with said user equipment within its coverage area, and each serving node being assigned to a respective routing area, said system comprising first monitoring means for monitoring the occurrence of a relocation condition, decision means for deciding, whether said relocation condition is an inter serving node relocation condition, switching means for switching the communication from a first access network controller of a first serving node to a second access network controller of a second serving node, when the decision by said decision means is positive, second monitoring means for monitoring, whether a changing condition is present; and changing means for changing the control of communication in the core network to the second serving node, when a changing condition is detected by said second monitoring means, while the control of communication in the core network is maintained anchored in the first serving node while the communication connection is in a first state in which it stays as long as there are data to be transmitted.

Moreover, a corresponding network element is proposed by the present invention.

Advantageous further developments of the present invention are as set out in the respective dependent claims.

According to the present invention, by using the proposed method and/or system and/or network element, the core network control remains advantageously in the same (first) serving node SGSN as long as there are packets to be sent. Consequently, a simple and robust relocation process is possible without a risk of loss of data. When it is most suitable for the user equipment (i.e. when the user equipment sends or receives no data), the control is changed to the new (second) serving node SGSN, which changing is initiated by the user equipment. This allows an optimization of the core network connectivity and therefore of the data flow for subsequent communications. Additionally, the user equipment can be simplified as it has only to know one instead of two procedures.

Preferred embodiments of the present invention are described herein below in detail by way of example with reference to the accompanying drawings.

DESCRIPTION OF PREFERRED EMBODIMENTS

Figure 1:
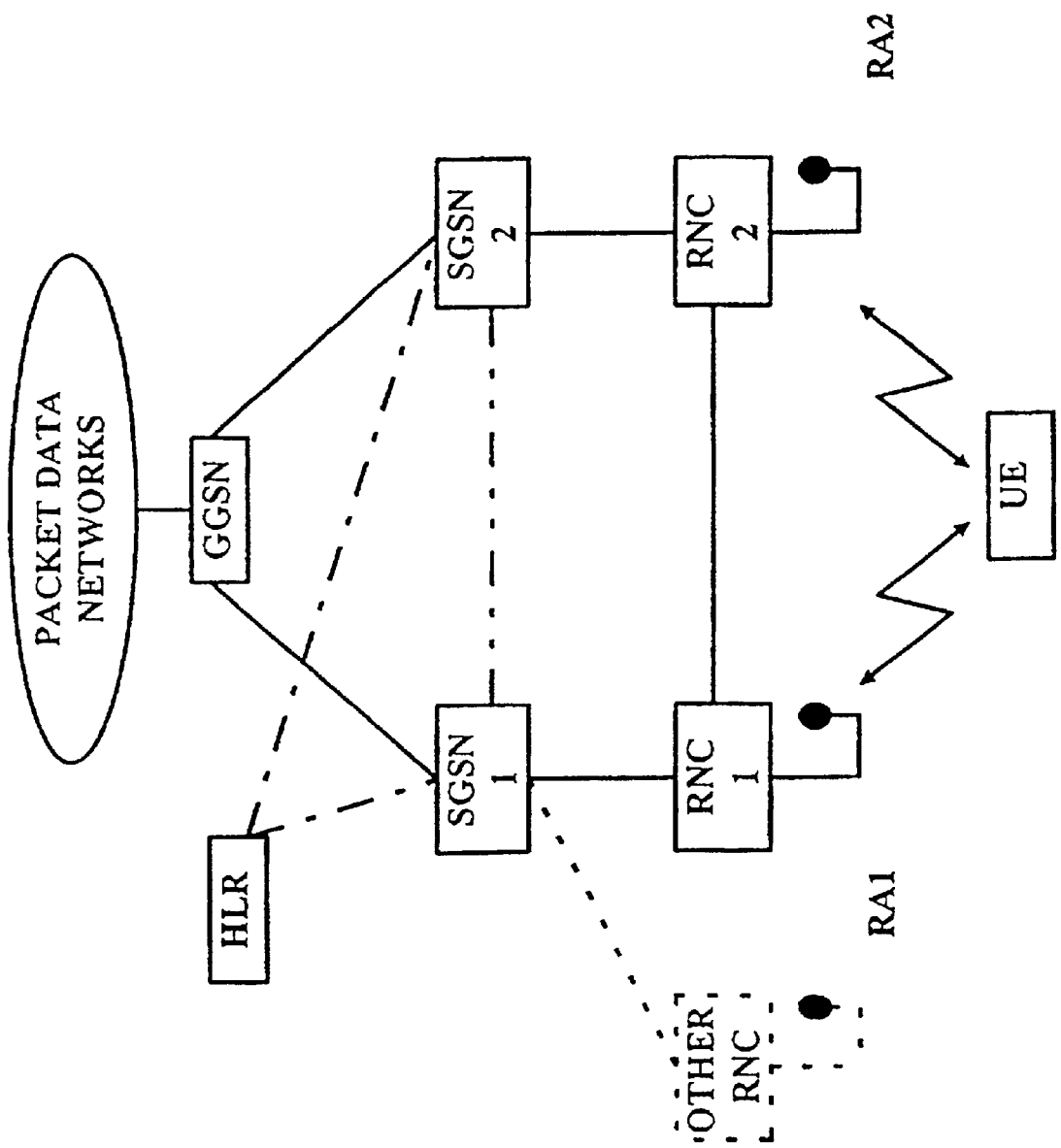
FIG. 1 is a block diagram showing a basic structure of a packet switched network system.

In FIG. 1 a simplified structure of a packet switched network system and the corresponding network elements is shown. An user equipment UE is moved within this system from one communication area or cell (not shown) to another, one or more of said communication areas being controlled by a radio network controller RNC. A routing area RA consists of one or more areas covered by radio network controllers. The radio network controllers RNC within one routing area RA are served by one serving node SGSN (Serving GPRS Support Node). The serving node SGSN is connected to a gateway node GGSN (Gateway GPRS Support Node) which provides connection to external networks.

When the user equipment UE moves from a communication area covered by a first radio network controller RNC1 to a communication area covered by another radio network controller (for example other RNC or RNC2, as shown in FIG. 1), a serving radio network controller (SRNC) relocation procedure is executed. This procedure is described above. When there is additionally a routing area change (RNC1 to RNC2), i.e. a change between serving nodes SGSN, an inter SGSN SPNC relocation procedure is to be executed.

Figure 3:
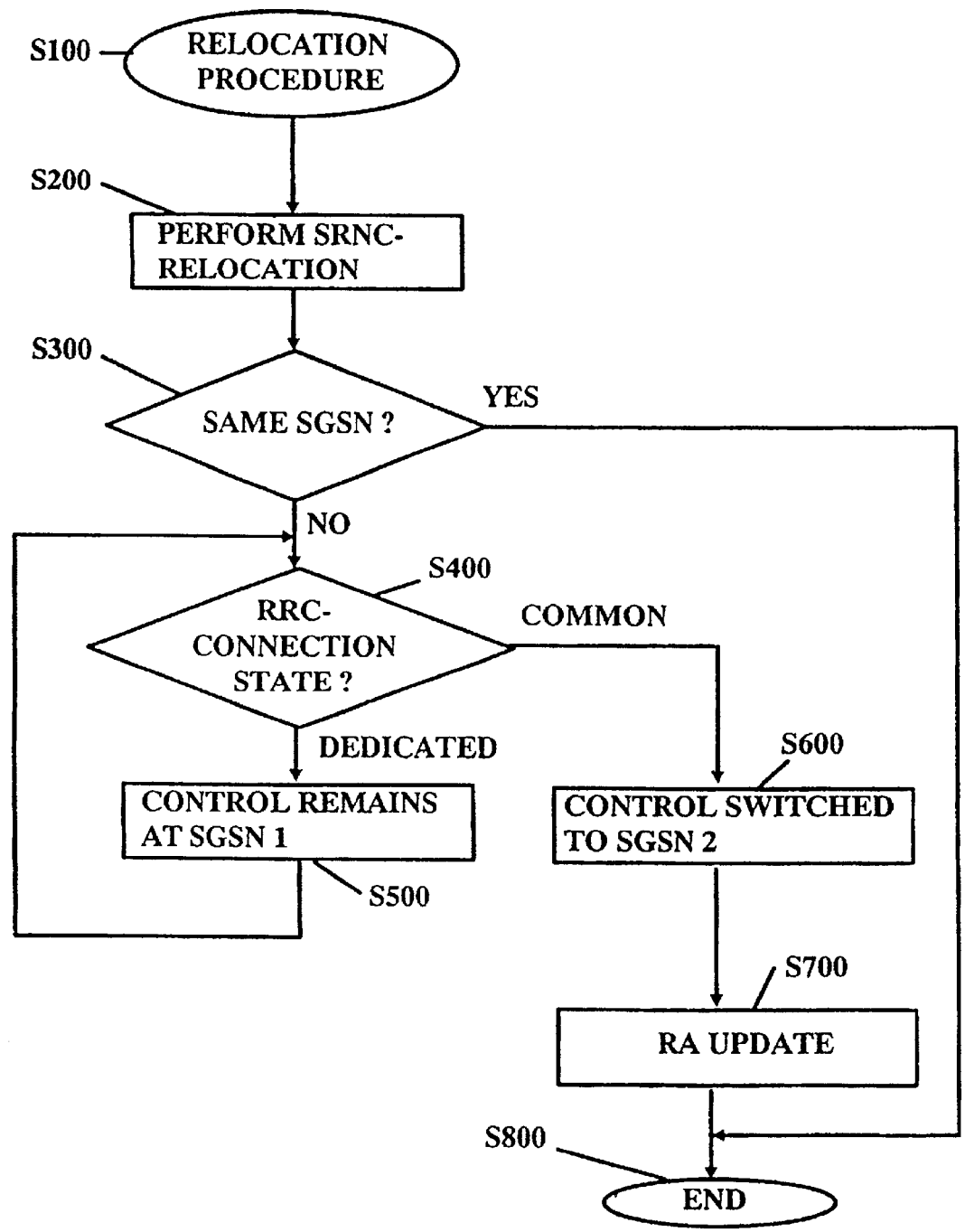
FIG. 3 is a flowchart showing a relocation procedure according to the present invention.

FIG. 3 shows a flowchart of the inter SGSN SRNC relocation procedure according to the present invention. In the beginning of said inter SGSN SRNC relocation procedure, the communication connection of the user equipment UE to the external networks for transmitting data is UE→RNC1→SGSN1→GGSN in uplink and vice versa for receiving data in downlink (see FIG. 1).

If the occurrence of a condition for a relocation due to, for example, the movement of the user equipment UE is detected upon monitoring (S100, S200), the relocation procedure is started. First, in step S300, it is decided, whether a change of the routing area RA (and therefore of the serving node SGSN) is combined with said relocation or not. If NO, only a serving radio network controller SRNC relocation procedure is executed without changing the serving node. After completion of this SRNC relocation without changing the serving node, the relocation procedure ends (S800).

If the decision in step S200 is YES, a SRNC relocation is performed (S300, S400) including a change of the serving node SGSN as described above. Thereafter, the communication connection from the user equipment UE to the external networks for transmitting data is UE→RNC2→SGSN2→SGSN 1→GGSN in uplink and vice versa in downlink for receiving data. In step S400 it is checked, whether a changing condition for the serving node change is fulfilled or not. This checking can be performed, for example, in the user equipment UE, in the radio network controller RNC or in the serving node SGSN. The changing condition is, for example, a change in a radio resource connection (RRC) state, i.e. the state of a radio connection between the user equipment UE and the communication network.

When the communication connection between the user equipment UE and the core network is in a first RRC state which is, for example, a RRC dedicated state, according to this embodiment, the decision in step S400 is NO and the control remains at the first serving node SGSN1 (S500). The RRC dedicated state is a connection state, in which a physical point to point bi-directional connection is established between the user equipment UE and the communication network. In this state it is possible to transmit data (particularly traffic data or use data) in uplink and downlink direction.

As the control in the core network remains at the first serving node as long as the changing condition is not fulfilled, the control can be regarded as being anchored.

However, if a change in the RRC state from the first state to a second state is detected (step S400), the decision in step S400 is YES. In this case, for example, no data is sent or received, therefore it is suitable for the user equipment UE that the control in the core network is changed. Hence, the user equipment initiates a change of the control in the core network to the second serving node SGSN2 (S600). According to the embodiment, the second state is, for example, a RRC common state. Here, the connection between the core network and the user equipment is active but the signaling resources are common. Stated in other words, control/signaling data but no traffic data are sent or received.

After switching the control to the second serving node SGSN2, communication connection of the user equipment UE to the external networks for transmitting data is UE→RNC2→SGSN2→GGSN in uplink and vice versa in downlink for receiving data. Then, the routing area update procedure is carried out (S700) and the relocation procedure is subsequently finished (S800)

It is to be noted, that the routing area update procedure and therefore the serving node change is initiated by the user equipment UE via a routing area update message which will be described later with reference to FIG. 4.

The RRC states (dedicated and common) are a reflection of the shared knowledge of the user equipment UE and also of the other communication network elements as to how much data is going uplink or downlink. Hence, they are used as an indicator to the user equipment UE when it is optimal to perform the change of control in the core network.

The advantage of initially anchoring or semi anchoring of the control in the first serving node SGSN1 is that, as long as data packets are to be sent (the radio resource connection is in the dedicated state), the risk of a data loss while switching control to another SGSN is inhibited. However, for reaching an optimal network connectivity, it is necessary to move control to the second serving node SGSN2. Therefore, if a changing condition is given by the user equipment UE (e.g. because of no data is to be sent or received, transmission buffers are empty or the like), the control is switched to the second serving node SGSN2, thereby optimizing core network connectivity.

As mentioned above, the switching over between respective serving nodes SGSN controlling the core network is initiated via a routing area update procedure started by the user equipment UE. This new procedure requires new messages which are described now with reference to FIG. 4.

Figure 4:
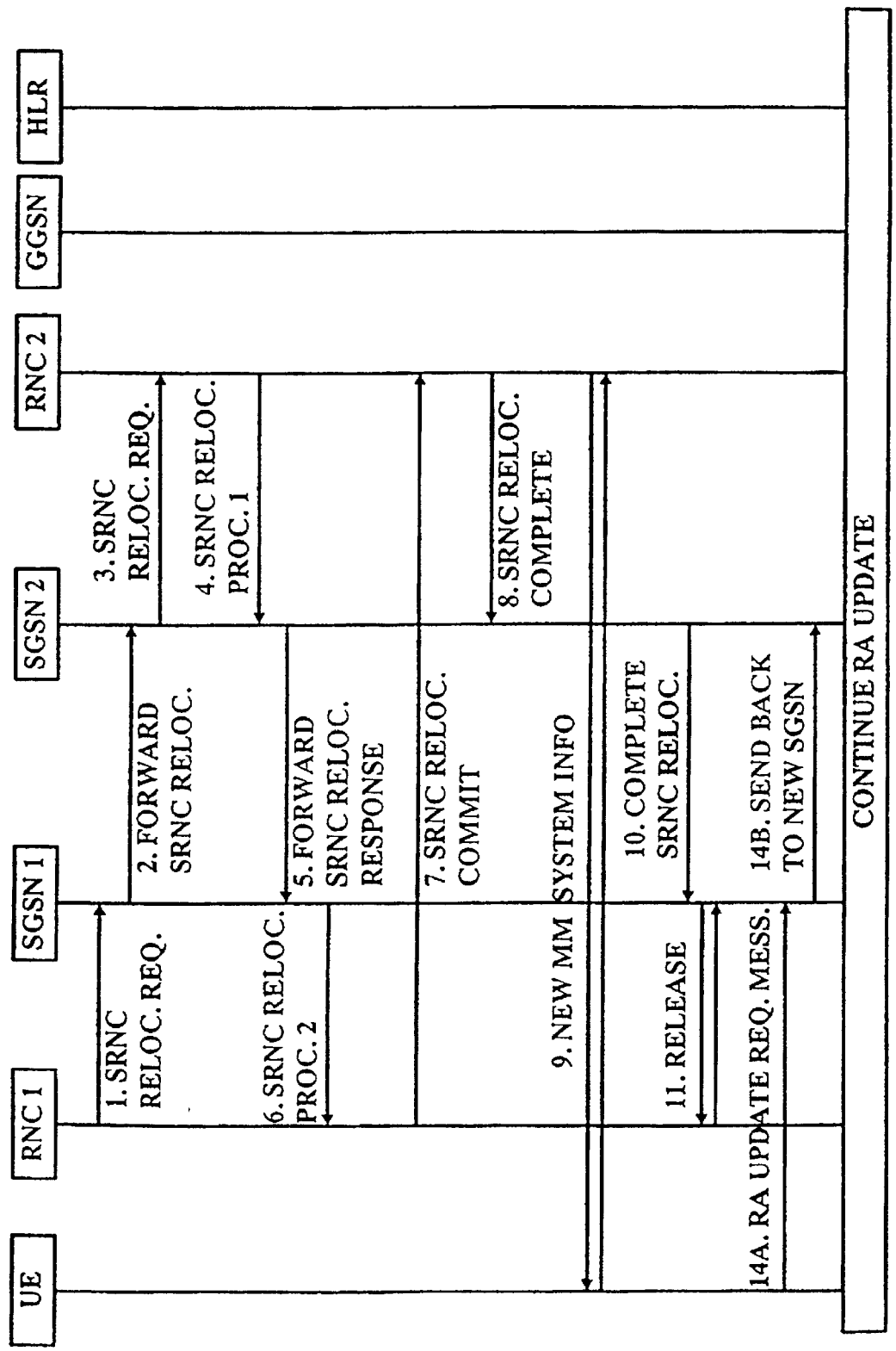
FIG. 4 is a diagram showing messages transmitted within the packet switched network system according to FIG. 1 in a relocation procedure according to the invention.

As shown in FIG. 4, the messages 1 to 9 refer to the SRNC relocation procedure as described above. Hence, a detailed description thereof can be omitted. Similar to the above described "anchored" solution, after the new SRNC has transmitted the MM system information to the user equipment UE (message 9), the serving node SGSN2 sends the complete SRNC relocation message 10 to the serving node SGSN1 which initiates a release message 11 to the radio network controller RNC1. At this time the communication connection is UE→RNC2→SGSN2→SGSN1→GGSN (see also FIG. 1). This means that the control in the core network is still at the SGSN1 (steps S400 and S500 in FIG. 3)

When, for example, no more data are to be sent or received and the communication connection of the user equipment UE and the communication network is switched to the RRC common state, the UE initiates the RA update procedure by message 14. Message 14A is a routing area update request message which is sent by the user equipment UE to the serving node SGSN1 processing the signaling. To simplify matters in FIG. 4, the message 14A is led directly to the serving node SGSN1 although it is easy to understand that it is sent via the radio controller RNC2 and the serving node SGSN2 to the serving node SGSN1. The serving node SGSN1 examines the message and relays it back to the serving node SGSN2 on the basis of the routing area (message 14B). Thereafter, the RA update is continued.

It is to be noted, that corresponding to the way message 14A is treated, the serving node SGSN2 may forward any message sent by the user equipment UE to the serving node SGSN1 (e.g. PDP context activation), because the user equipment UE may have sent the message to the core network before it receives the MM system information, or connection is changed to the RRC common state.

Due to intimately involving the user equipment UE in the relocation procedure it is possible to inhibit problems like PDP context loss or the like.

Figure 5:
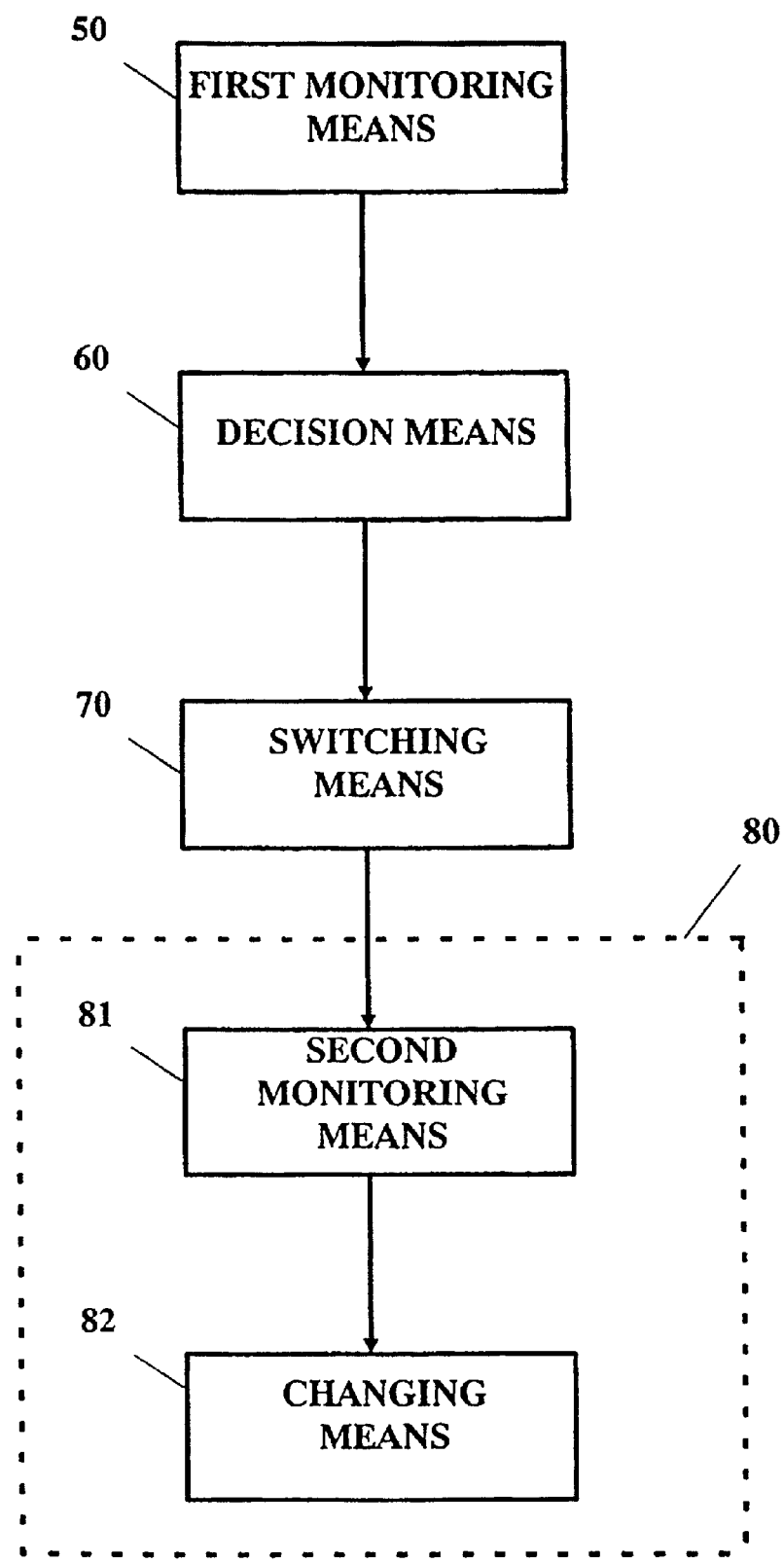
FIG. 5 is a block circuit diagram showing a system and network element adapted to perform a relocation according to the invention.

With reference to FIG. 5, in the following a system is described which is adapted to perform the inter SGSN SRNC relocation procedure according to the present invention. The system comprises a first monitoring means 50 by which the occurrence of a relocation condition indicating a change of the SRNC is monitored. In a decision means 60 it is decided, whether said relocation condition is an inter serving node relocation condition, namely, the corresponding radio network controllers (i.e. the access network controllers) are within separate routing areas RA. When the decision by said decision means (60) indicates, that the corresponding radio network controllers are within different routing areas RA, a switching means 70 switches the communication connection from the first radio network controller RNC1 of the first serving node SGSN1 to a second radio network controller RNC2 of a second serving node SGSN2. Thereafter, the communication connection from the user equipment UE to the external networks for transmitting data is UE→RNC2→SGSN2→SGSN 1→GGSN in uplink and vice versa in downlink for receiving data.

A second monitoring means 81 monitors, whether a changing condition for the serving node change is fulfilled or not. This checking can be performed, for example, in the user equipment UE, in the radio network controller RNC or in the serving node SGSN. The changing condition is, for example, a change in a radio resource connection (RRC) state, i.e. the state of a radio connection between the user equipment UE and the communication network.

A changing means 82 is adapted to perform a change of the control of communication in the core network. As long as the monitoring by said second monitoring means 81 indicates no changing condition (e.g., the communication connection is in a first state, such as a RRC dedicated state, as mentioned above), the control of communication in the core network is maintained anchored in the first serving node SGSN1. However, if the monitoring indicates a changing condition (e.g., the communication connection is in a second state, such as a RRC common state, as mentioned above), the control of communication in the core network is changed to the second serving node SGSN2 the by said changing means 82. After changing the control to the second serving node SGSN2, communication connection of the user equipment UE to the external networks for transmitting data is UE→RNC2→SGSN2→GGSN in uplink and vice versa in downlink for receiving data.

The second monitoring means 81 and the changing means 82 can be part of a network element 80, which is adapted to maintain the control of communication in the core network anchored in the first serving node SGSN1, while the communication connection is in a first state (i.e. no changing condition is detected). When a changing condition is monitored by said second monitoring means 81, said network element 80 is adapted to change the control of communication in the core network to the second serving node SGSN2. The network element 80 can be introduced, for example, in the user equipment UE, in the access network controller (i.e. in the radio network controller) or in the serving node SGSN.

As an alternative, in a second embodiment, the SGSN changing condition in step S400 can also include both, the common and the dedicated RRC state. This is possible, when the quality of service (QoS) is not significantly affected by this kind of relocation (or handover).

Figure 2A:
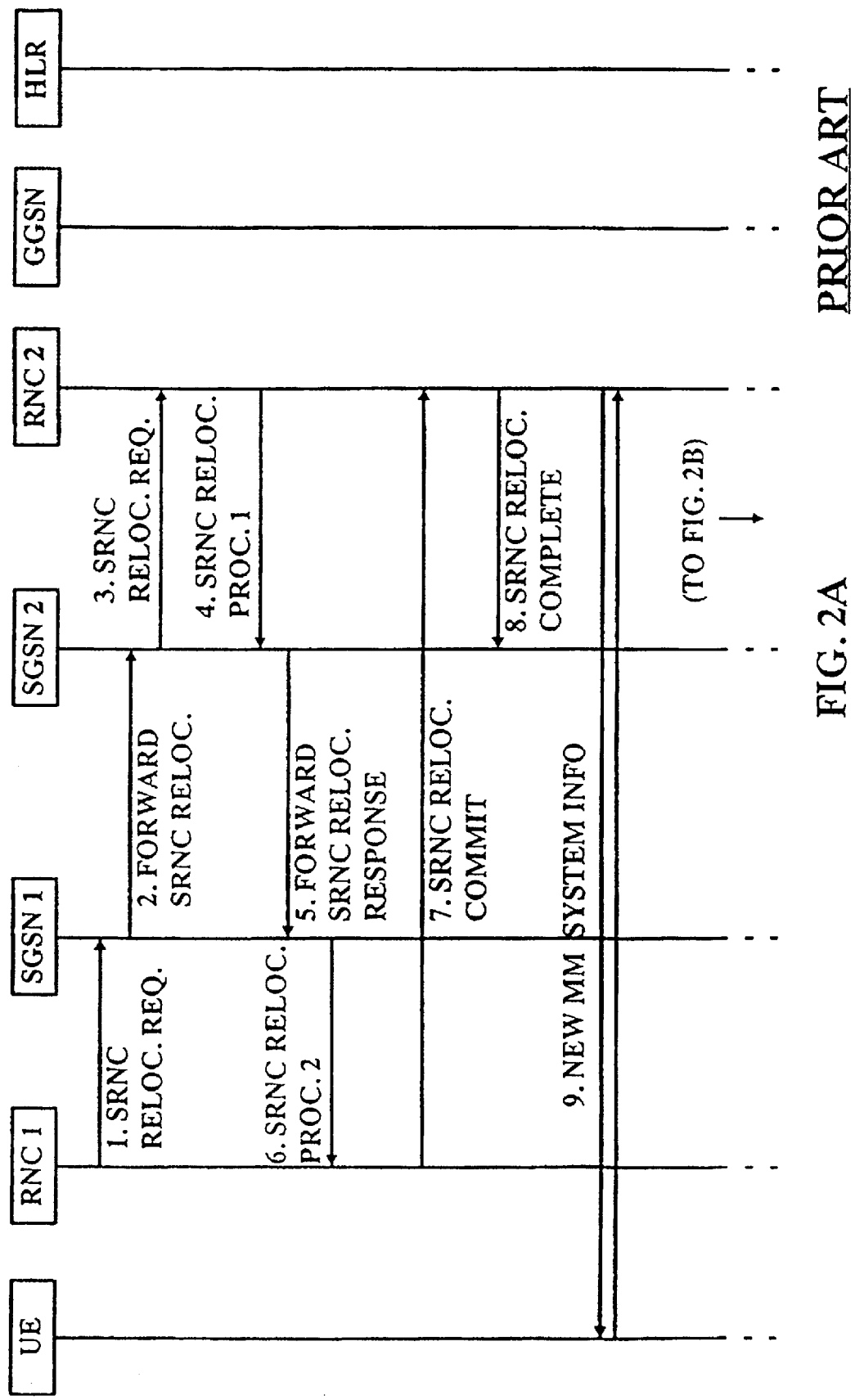
FIGS. 2A and 2B are diagrams showing messages transmitted within the packet switched network system according to FIG. 1 in a conventional relocation procedure.
Figure 2B:
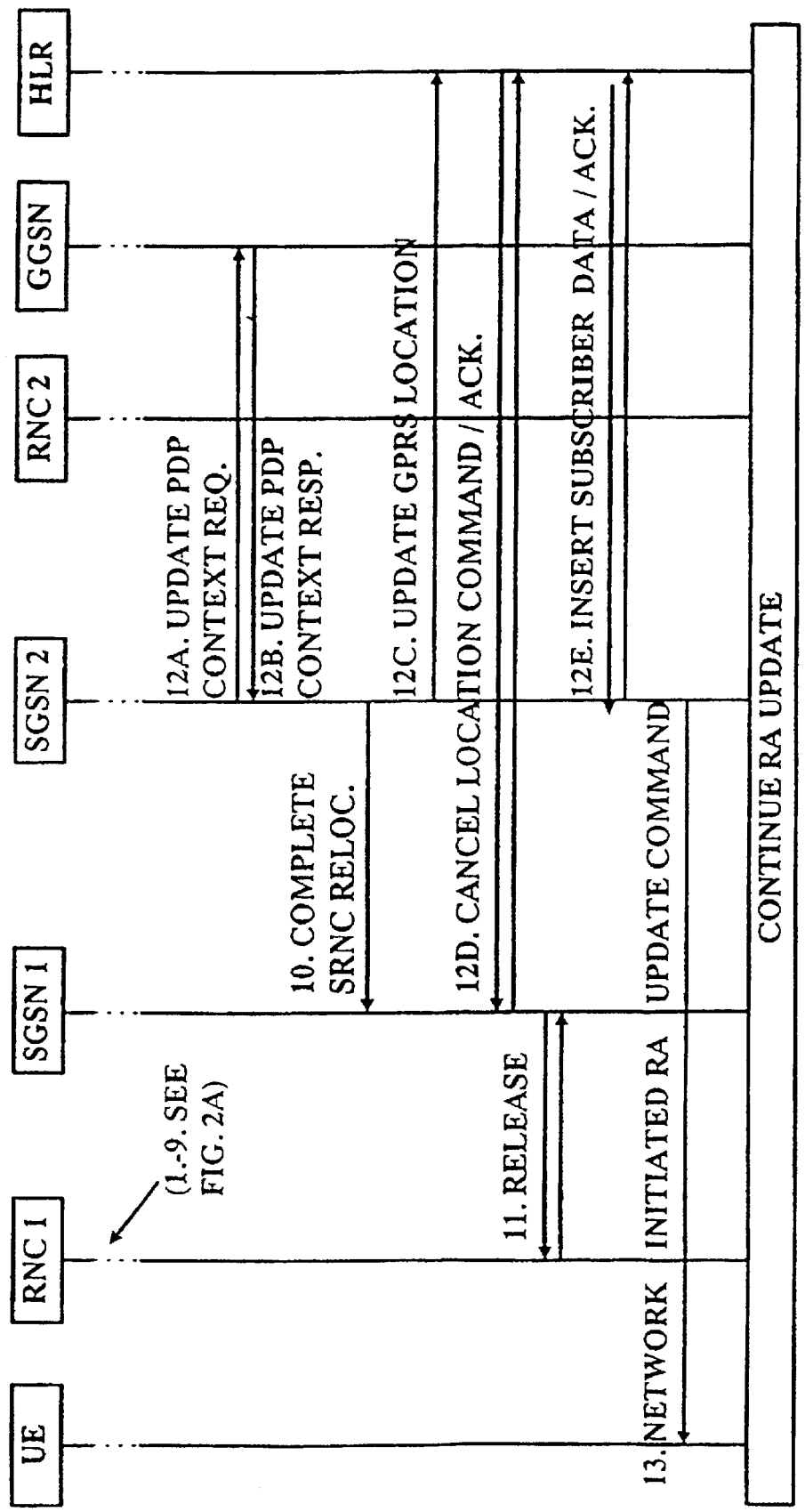

The advantage is that the user equipment UE is simplified, because it works in the same way in both RRC states. Furthermore, a possible error of the above mentioned "floating" solution is removed, since the routing area update is initiated by the user equipment UE. Namely, in the "floating" solution, when the user equipment UE moves out of the coverage area after sending the message 9 (see FIG. 2A) such that it does not receive the network initiated RA update command message 13 (see FIG. 2B), the PDP contexts of the user equipment are sent to the new SGSN for which the user equipment UE may not identified correctly. This can result in a confusion of the serving node SGSN to which user equipment the PDP contexts are to be directed. By using the semi anchored solution in such a case, this error can be prevented, since the user equipment UE itself decides to perform the routing area update.

The decision under which circumstances the routing area update is to be performed (and hence the switching of the serving node) depends on the Quality of Service (QoS) negotiated for the respective communication network.

It is obvious, that the system and the network element for performing the inter SGSN SRNC relocation procedure described above with reference to the first embodiment are also applicable in the case, that a changing condition according to the second embodiment is used.

The invention is particularly usable used in a packet switched network in third generation systems, but it is obvious that it can be used also in other corresponding systems.

As described above, according to the present invention a method is proposed for performing a relocation procedure for a user equipment UE communicating in a packet oriented communication network and being movable therein, said packet oriented communication network comprising at least two serving nodes SGSN1, SGSN2 of a core network of said packet oriented communication network, each of which serving nodes being connected to at least one access network controller RNC1, RNC2 of a access network of said packet oriented communication network, each of which access network controllers being adapted to perform a communication with said user equipment UE within its coverage area, and each serving node being assigned to a respective routing area RA1, RA2, said method comprising the steps of monitoring (S100,S200) the occurrence of a relocation condition, deciding (S300, S400), whether said relocation condition is an inter serving node relocation condition, switching (S400) the communication from a first access network controller RNC1 of a first serving node SGSN1 to a second access network controller RNC2 of a second serving node SGSN2, when the decision in said decision step (S300) is positive, maintaining (S500) the control of communication in the core network anchored in the first serving node SGSN1 while the communication connection is in a first state in which it stays as long as there are data to be transmitted, and changing (S600) the control of communication in the core network to the second serving node SGSN2, when a changing condition is detected. The present invention also proposes a corresponding system and network element.

It should be understood that the above description and accompanying figures are merely intended to illustrate the present invention by way of example only. The preferred embodiments of the present invention may thus vary within the scope of the attached claims.

What is claimed is:

1. A method for performing a relocation procedure for a user equipment (UE) communicating in a packet oriented communication network and being movable therein, said packet oriented communication network comprising at least two serving nodes (SGSN1, SGSN2) of a core network of said packet oriented communication network, each of which serving nodes being connected to at least one access network controller (RNC1, RNC2) of a access network of said packet oriented communication network, each of which access network controllers being adapted to perform a communication with said user equipment (UE) within its coverage area, and each serving node being assigned to a respective routing area (RA1, RA2), said method comprising the steps of:

monitoring (S100,S200) the occurrence of a relocation condition, deciding (S300, S400), whether said relocation condition is an inter serving node relocation condition, switching (S400) the communication from a first access network controller (RNC1) of a first serving node (SGSN1) to a second access network controller (RNC2) of a second serving node (SGSN2), when the decision in said decision step (S300) is positive;

maintaining (S500) the control of communication in the core network anchored in the first serving node (SGSN1) while the communication connection is in a first state in which it stays as long as there are data to be transmitted; and changing (S600) the control of communication in the core network to the second serving node (SGSN2), when a changing condition is detected.

2. A method according to claim 1, wherein the changing condition is detected by the user equipment (UE).

3. A method according to claim 1, wherein the changing condition is detected by the access network controller (RNC1, RNC2).

4. A method according to claim 1, wherein the changing condition is detected by the serving node (SGSN1, SGSN2).

5. A method according to claim 1, wherein said changing step (S600) is initiated by said user equipment (UE).

6. A method according to claim 1, wherein said changing step (S600) is initiated by a routing area update request message (14A, 14B) issued by said user equipment (UE).

7. A method according to claim 6, wherein said routing area update request message (14A, 14B) is issued when said communication connection changes to a second state.

8. A method according to claim 6, wherein said routing area update request message (14A, 14B) is issued when said communication connection is still in said first state.

9. A method according to claim 1, wherein said first state is a dedicated state, in which a physical point to point bi-directional connection is established between said user equipment and said packet oriented communication network.

10. A method according to claim 7, wherein
said second state is a common state.

11. A method according to claim 7, wherein
said second state is entered when transmission buffers have been emptied.

12. A method according to claim 6, further comprising the steps of:

forwarding the routing area update request message (14A) by the second serving node (SGSN2) transparently to the first serving node (SGSN1), examining the routing area update request message (14A) by the first serving node (SGSN1), and relaying the routing area update request message (14B) back from the first serving node (SGSN1) to the second serving node (SGSN2).

13. A method according to claim 12, further comprising a step of forwarding any message sent by the user equipment (UE) by the second serving node (SGSN2) to the first serving node (SGSN1).

14. A system for performing a relocation procedure
for a user equipment (UE) communicating in a packet oriented communication network and being movable therein, said packet oriented communication network comprising at least two serving nodes (SGSN1, SGSN2) of a core network of said packet oriented communication network, each of which serving nodes being connected to at least one access network controller (RNC1, RNC2) of a access network of said packet oriented communication network, each of which access network controllers being adapted to perform a communication with said user equipment (UE) within its coverage area, and each serving node being assigned to a respective routing area (RA1, RA2), said system comprising:

first monitoring means (50) for monitoring the occurrence of a relocation condition, decision means (60) for deciding, whether said relocation condition is an inter serving node relocation condition, switching means (70) for switching the communication from a first access network controller (RNC1) of a first serving node (SGSN1) to a second access network controller (RNC2) of a second serving node (SGSN2), when the decision by said decision means (60) is positive;

second monitoring means (81) for monitoring, whether a changing condition is present; and changing means (82) for changing the control of communication in the core network to the second serving node (SGSN2), when a changing condition is detected by said second monitoring means (81), while the control of communication in the core network is maintained anchored in the first serving node (SGSN1) while the communication connection is in a first state in which it stays as long as there are data to be transmitted.

15. A network element (80), which is adapted to perform a relocation procedure for a user equipment (UE) communicating in a packet oriented communication network and being movable therein, said packet oriented communication network comprising at least two serving nodes (SGSN1, SGSN2) of a core network of said packet oriented communication network, each of which serving nodes being connected to at least one access network controller (RNC1, RNC2) of a access network of said packet oriented communication network, each of which access network controllers being adapted to perform a communication with said user equipment (UE) within its coverage area, and each serving node being assigned to a respective routing area (RA1, RA2), said network element comprising a second monitoring means (81) for monitoring, whether a changing condition is present, and a changing means (82) adapted to change the control of communication in the core network to the second serving node (SGSN2), when a changing condition is detected by said second monitoring means (81), and adapted to maintain the control of communication in the core network anchored in the first serving node (SGSN1) while the communication connection is in a first state in which it stays as long as there are data to be transmitted.

16. A network element (80) according to claim 15, wherein said network element is part of the user equipment (UE).

17. A network element (80) according to claim 15, wherein said network element is part of the access network controller (RNC1, RNC2).

18. A network element (80) according to claim 15, wherein said network element is part of the serving node (SGSN1, SGSN2).

\* \* \* \* \*